(12) United States Patent
Li

(10) Patent No.: US 12,356,262 B2
(45) Date of Patent: Jul. 8, 2025

(54) CELL HANDOVER METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Haitao Li, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 374 days.

(21) Appl. No.: 17/902,581

(22) Filed: Sep. 2, 2022

(65) Prior Publication Data

US 2022/0417822 A1    Dec. 29, 2022

Related U.S. Application Data

(63) Continuation of application No. PCT/CN2020/081389, filed on Mar. 26, 2020.

(51) Int. Cl.
| | |
|---|---|
| *H04W 4/00* | (2018.01) |
| *H04W 36/00* | (2009.01) |
| *H04W 36/36* | (2009.01) |
| *H04W 36/30* | (2009.01) |
| *H04W 36/32* | (2009.01) |

(52) U.S. Cl.
CPC ... *H04W 36/00837* (2018.08); *H04W 36/362* (2023.05); *H04W 36/302* (2023.05); *H04W 36/322* (2023.05)

(58) Field of Classification Search
CPC ......... H04W 36/00837; H04W 36/362; H04W 36/302; H04W 36/322; H04W 84/06; H04W 36/0055; H04W 36/0058

USPC ......................................................... 370/331
See application file for complete search history.

(56) References Cited

U.S. PATENT DOCUMENTS

| | | | | |
|---|---|---|---|---|
| 9,386,494 | B2 * | 7/2016 | Kapoor | H04W 36/0066 |
| 10,880,761 | B2 * | 12/2020 | Nagaraja | H04W 74/02 |
| 11,096,150 | B2 * | 8/2021 | Wong | H04W 72/541 |
| 11,108,755 | B2 * | 8/2021 | Sharma | H04L 63/062 |
| 11,265,772 | B2 * | 3/2022 | Vaidya | H04W 36/362 |
| 11,283,777 | B2 * | 3/2022 | Sharma | H04L 9/12 |
| 11,304,102 | B2 * | 4/2022 | Tseng | H04W 74/0808 |
| 11,419,015 | B2 * | 8/2022 | Da Silva | H04B 7/0619 |
| 11,510,114 | B2 * | 11/2022 | Yiu | H04W 36/0072 |

(Continued)

FOREIGN PATENT DOCUMENTS

| | | |
|---|---|---|
| CN | 101207923 A | 6/2008 |
| CN | 102088748 A | 6/2011 |

(Continued)

OTHER PUBLICATIONS

First Office Action issued in corresponding Japanese application No. 2022-554257, mailed Feb. 2, 2024.

(Continued)

*Primary Examiner* — Amancio Gonzalez
(74) *Attorney, Agent, or Firm* — BAYES PLLC

(57) ABSTRACT

A cell handover method, an electronic device, and a storage medium. The method comprises: a terminal device receives a handover trigger condition, the handover trigger condition comprising a condition based on a time window (S201), the time window being representing a handover time when the terminal device initiates a conditional handover.

16 Claims, 6 Drawing Sheets

(56) References Cited

U.S. PATENT DOCUMENTS

| | | | |
|---|---|---|---|
| 11,736,995 B2* | 8/2023 | Han | H04L 5/0055 |
| | | | 370/331 |
| 12,041,497 B2* | 7/2024 | Ohlsson | H04W 74/0833 |
| 12,089,107 B2* | 9/2024 | Ishii | H04W 36/08 |
| 12,143,872 B2* | 11/2024 | Parichehrehteroujeni | |
| | | | H04W 36/305 |
| 12,143,877 B2* | 11/2024 | Tseng | H04W 76/27 |
| 12,150,003 B2* | 11/2024 | Ishii | H04W 76/15 |
| 2007/0198682 A1* | 8/2007 | Pazhyannur | H04L 67/148 |
| | | | 709/223 |
| 2012/0088508 A1 | 4/2012 | Matsuo et al. | |
| 2019/0223073 A1 | 7/2019 | Chen et al. | |
| 2019/0230568 A1 | 7/2019 | Arur et al. | |
| 2021/0235342 A1* | 7/2021 | Zhu | H04W 36/00838 |
| 2021/0282050 A1* | 9/2021 | Adjakple | H04L 1/1874 |
| 2022/0078873 A1* | 3/2022 | Belleschi | H04W 28/24 |
| 2022/0191755 A1* | 6/2022 | Ohlsson | H04W 36/00837 |
| 2022/0272589 A1* | 8/2022 | Ishii | H04W 36/0038 |
| 2022/0272591 A1* | 8/2022 | Tseng | H04W 36/0094 |
| 2022/0303844 A1* | 9/2022 | Viering | H04W 36/0016 |
| 2022/0386195 A1* | 12/2022 | Ishii | H04W 36/0069 |
| 2022/0386207 A1* | 12/2022 | Rugeland | H04W 76/15 |
| 2022/0408323 A1* | 12/2022 | Ishii | H04W 36/0055 |
| 2023/0025432 A1* | 1/2023 | Da Silva | H04W 64/006 |
| 2023/0072340 A1* | 3/2023 | El Hamss | H04W 74/0833 |
| 2023/0164607 A1* | 5/2023 | Koskela | H04W 24/10 |
| | | | 370/328 |
| 2023/0344508 A1* | 10/2023 | Tseng | H04W 56/005 |
| 2024/0056917 A1* | 2/2024 | Kim | H04W 36/00835 |

FOREIGN PATENT DOCUMENTS

| | | |
|---|---|---|
| CN | 103907376 A | 7/2014 |
| CN | 104684019 A | 6/2015 |
| CN | 104756546 A | 7/2015 |
| CN | 109151925 A | 1/2019 |
| CN | 110582094 A | 12/2019 |

OTHER PUBLICATIONS

First Office Action issued in corresponding Indian application No. 202217051407, mailed Apr. 4, 2024.
International Search Report issued in International application No. PCT/CN2020/081389, mailed Dec. 28, 2020.
Written Opinion of the International Searching Authority issued in International application No. PCT/CN2020/081389, mailed Dec. 28, 2020.
3GPP TR 38.821 V1.0.0 (Dec. 2019); Technical Specification Group Radio Access Network; Solutions for NR to support non-terrestrial networks (NTN) (Release 16).
Priority Review issued in corresponding Chinese application No. 202211642030.3, mailed May 30, 2024.
First Office Action issued in corresponding Chinese application No. 202211642030.3, mailed Jun. 20, 2024.
Second Office Action issued in corresponding Japanese application No. 2022-554257, mailed Jul. 30, 2024.
Source: NEC; Title: Location based mobility enhancement 3GPP TSG-RAN WG2 #108 R2-1914973 Reno, USA, Nov. 18-22, 2019.
Extended European Search Report issued in corresponding European application No. 20927099.0, mailed Mar. 13, 2023.
LG Electronics Inc., "LEO satellites mobility issues in NTN", R2-1907895, 3GPP TSG-RAN WG2 Meeting #106 Reno, U.S.A., May 13-May 17, 2019.
LG Electronics Inc. "Considerations on CHO in NTN", R2-1911346, 3GPP TSG-RAN WG2 Meeting #107bis Chongqing, China, Oct. 14-Oct. 18, 2019.
InterDigital, "Conditional measurement configuration for LEO NTN", R2-1915770, 3GPP RAN WG2 Meeting #108 Reno, USA Nov. 18-22, 2019.
Second Office action issued in corresponding Chinese Application No. 202211642030.3, mailed on Nov. 17, 2024, 20 pages.
Decision of Refusal issued in Japanese Application No. 2022-554257, mailed Dec. 6, 2024, 8 pages.
Third Office Action issued in corresponding Chinese Application No. 202211642030.3, dated Feb. 19, 2025, 15 pages.

* cited by examiner

US 12,356,262 B2

CELL HANDOVER METHOD, ELECTRONIC DEVICE, AND STORAGE MEDIUM

CROSS-REFERENCE TO RELATED APPLICATION

This application is a continuation of International Application No. PCT/CN2020/081389, filed Mar. 26, 2020, the entire contents of which are incorporated herein by reference.

TECHNICAL FIELD

The present application relates to the field of wireless communication technologies, and in particular, to a cell handover method, an electronic device, and a storage medium.

BACKGROUND

In a non-terrestrial communication network (Non Terrestrial Network, NTN), how a terminal device performs a conditional handover to improve the success rate of the conditional handover has not yet been clarified.

SUMMARY

Embodiments of the present application provide a cell handover method, an electronic device, and a storage medium, which can improve the success rate of conditional handover.

In a first aspect, the embodiments of the present application provide a cell handover method, including: receiving, by a terminal device, a handover trigger condition; where the handover trigger condition includes a condition based on a time window, and the time window is used for representing a handover time during which the terminal device initiates a conditional handover.

In a second aspect, the embodiments of the present application provide a cell handover method, including: sending, by a source network device, a first message;
where the first message includes location information of a terminal device and a latest moment of cell handover, or the first message includes the location information of the terminal device.

In a third aspect, the embodiments of the present application provide a cell handover method, including: receiving, by a target network device, a first message; where the first message includes location information of a terminal device and a latest moment of cell handover, or the first message includes the location information of the terminal device.

In a fourth aspect, the embodiments of the present application provide a terminal device, where the terminal device includes: a first receiving unit configured to receive a handover trigger condition; the handover trigger condition includes a condition based on a time window, and the time window is used for representing a handover time during which the terminal device initiates a conditional handover.

In a fifth aspect, the embodiments of the present application provide a source network device, where the source network device includes: a second sending unit configured to send a first message; the first message includes location information of a terminal device and a latest moment of cell handover, or the first message includes the location information of the terminal device.

In a sixth aspect, the embodiments of the present application provide a target network device, where the target network device includes: a fourth receiving unit configured to receive a first message; the first message includes location information of a terminal device and a latest moment of cell handover, or the first message includes the location information of the terminal device.

In a seventh aspect, the embodiments of the present application provide a terminal device, including a processor and a memory for storing a computer program executable on the processor, where the processor is configured to, when running the computer program, execute the above-mentioned steps of the cell handover method performed by the terminal device.

In an eighth aspect, the embodiments of the present application provide a source network device, including a processor and a memory for storing a computer program executable on the processor, where the processor is configured to, when running the computer program, execute the above-mentioned steps of the cell handover method performed by the source network device.

In a ninth aspect, the embodiments of the present application provide a target network device, including a processor and a memory for storing a computer program executable on the processor, where the processor is configured to, when running the computer program, execute the above-mentioned steps of the cell handover method performed by the target network device.

In a tenth aspect, the embodiments of the present application provide a chip, including: a processor for invoking and running a computer program from a memory, so that a device installed with the chip executes the cell handover method performed by the terminal device.

In an eleventh aspect, the embodiments of the present application provide a chip, including: a processor for invoking and running a computer program from a memory, so that a device installed with the chip executes the cell handover method performed by the source network device.

In a twelfth aspect, the embodiments of the present application provide a chip, including: a processor for invoking and running a computer program from a memory, so that a device installed with the chip executes the cell handover method executed by the target network device.

In a thirteenth aspect, the embodiments of the present application provide a storage medium storing an executable program, and when the executable program is executed by a processor, the above-mentioned cell handover method performed by the terminal device is implemented.

In a fourteenth aspect, the embodiments of the present application provide a storage medium storing an executable program, and when the executable program is executed by a processor, the above-mentioned cell handover method performed by the source network device is implemented.

In a fifteenth aspect, the embodiments of the present application provide a storage medium storing an executable program, and when the executable program is executed by a processor, the above-mentioned cell handover method performed by the source network device is implemented.

In a sixteenth aspect, the embodiments of the present application provide a computer program product, including computer program instructions, the computer program instructions enable a computer to execute the above-mentioned cell handover method performed by the terminal device.

In a seventeenth aspect, the embodiments of the present application provide a computer program product, including computer program instructions, the computer program instructions enable a computer to execute the above-mentioned cell handover method performed by the source network device.

In an eighteenth aspect, the embodiments of the present application provide a computer program product, including computer program instructions, the computer program instructions enable a computer to execute the above-mentioned cell handover method performed by the target network device.

In a nineteenth aspect, the embodiments of the present application provide a computer program, where the computer program enables a computer to execute the cell handover method performed by the terminal device.

In a twentieth aspect, the embodiments of the present application provide a computer program, the computer program enables a computer to execute the cell handover method performed by the source network device.

In a twenty-first aspect, the embodiments of the present application provide a computer program, where the computer program enables a computer to execute the cell handover method performed by the source network device.

The cell handover method, electronic device, and storage medium provided by the embodiments of the present application include: a terminal device receiving a handover trigger condition sent by a source network device; the handover trigger condition including a condition based on a time window, and the time window being used for representing a handover time during which the terminal device initiates a conditional handover. In this way, the terminal device can determine whether to initiate the conditional handover according to the time window in the handover trigger condition, thereby improving the success rate of the conditional handover.

DETAILED DESCRIPTION

Figure 1:
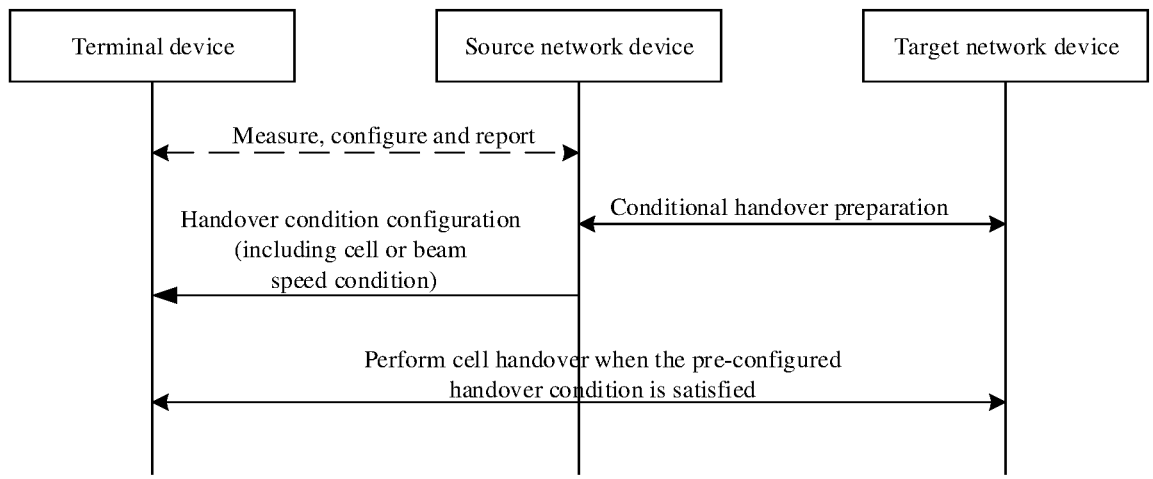
FIG. 1 is a schematic diagram of a processing flow of conditional handover according to the present application.

In order to understand the features and technical contents of the embodiments of the present application in more detail, the implementation of the embodiments of the present application will be described in detail below with reference to the accompanying drawings. The attached drawings are only for reference and explanation, and are not intended to define the embodiments of the present application.

Before the detailed description of the embodiments of the present application, the following brief description is given.

NTN provides a communication service to terrestrial users by means of satellite communication. Compared with terrestrial cellular network communication, satellite communication has many unique advantages. First of all, satellite communication is not limited by the user's geographical area. For example, general terrestrial communication cannot cover areas such as oceans, mountains, or deserts that cannot be equipped with communication equipment or are not covered by communication due to sparse population. For satellite communication, due to that one satellite can cover a large area of the ground, and the satellite can orbit around the earth, theoretically every corner of the earth can be covered by satellite communication. Secondly, satellite communication has a high social value. Satellite communication can cover remote mountainous areas and poor and backward countries or regions at low cost, so that people in these regions can enjoy advanced voice communication and mobile Internet technologies, which is conducive to narrowing the digital divide with developed regions and promoting development in these regions. Thirdly, the distance of satellite communication is long, and the increase of the communication distance will not significantly increase the cost of communication. Finally, the satellite communication has high stability and is not limited by natural disasters.

Communication satellites are classified into Low-Earth Orbit (LEO) satellites, Medium-Earth Orbit (MEO) satellites, Geostationary Earth Orbit (GEO) satellites, and High Elliptical Orbit (HEO) satellites according to their orbital altitudes. A brief description of LEO and GEO is given below.

The orbital altitude of LEO ranges from 500 km to 1500 km, and the corresponding orbital period is about 1.5 hours to 2 hours. The signal propagation delay of single-hop communication between terminal devices is generally less than 20 ms. The maximum satellite viewing time is 20 minutes. The signal propagation distance is short, the link loss is small, and the transmission power requirement of the terminal device is not high.

The orbital altitude of GEO is 35,786 km and a rotation period of GEO around the earth is 24 hours. The signal propagation delay of single-hop communication between terminal devices is generally 250 ms. In order to ensure the coverage of the satellite and improve a system capacity of the entire satellite communication system, the satellite uses multiple beams to cover the ground. One satellite can form dozens or even hundreds of beams to cover the ground; and one satellite beam can cover the ground area with a diameter of tens to hundreds of kilometers.

In order to ensure the coverage of the satellite and improve the system capacity of the entire satellite communication system, the satellite uses multiple beams to cover the ground. One satellite can form dozens or even hundreds of beams to cover the ground; and one satellite beam can cover the ground area with a diameter of tens to hundreds of kilometers.

Similar to the LTE system, New Radio (NR) system supports a handover process of the terminal device in a connected state. When the terminal device that is using the network service moves from one cell to another, or due to the adjustment of the radio transmission traffic load, activation of operation and maintenance, equipment failure, etc., in order to ensure the continuity of communication and the quality of service, the system shall transfer the communication link between the terminal device and the original cell to a new cell, that is, performing the handover process.

Taking the Xn interface handover process as an example, the cell handover process applicable to the LTE system and the NR system is divided into the following three stages.

The first stage is handover preparation, including measurement control and reporting, handover request and handover confirmation message. The handover confirmation message includes a handover command generated by a target cell, and a source cell is not allowed to make any modification to the handover command generated by the target cell, but directly forwards the handover command to the terminal device.

The second stage is handover execution: the terminal device immediately performs the handover process after receiving the handover command, that is, the terminal device is disconnected from the source cell and connects with the target cell (such as performing random access, sending an RRC handover complete message to the target network device, etc.); Secondary Node (SN) state is transferred, and data is forwarded.

The third stage is that handover is completed: the target cell performs a Path Switch with the Access and Mobility Management Function (AMF) and the User Port Function (UPF), and releases a terminal device context of the source network device.

In view of the problems of frequent handovers and handover failures in high-speed mobile scenarios and high-frequency deployment scenarios, 3GPP is currently discussing the introduction of a conditional handover for LTE and NR systems. The conditional handover process is shown in FIG. 1. The terminal device performs handover to the target cell according to the pre-configured handover command (that is, triggering the random access process and sending a handover complete message) when evaluating a conditional trigger related to the target cell according to the condition configured by the network device, to avoid the problem that it is too late or unable to send a measurement report and receive a handover command due to high-speed movement into a poor coverage area. In the conditional handover, the source network device cannot predict to which target network device the terminal device initiates cell handover when the handover trigger condition is satisfied. The handover trigger condition may be identified by one or two measurement identification, and two measurement identifications may be applied to at most two measurement events, such as A3 event and A5 event. When the trigger condition of a certain target cell is satisfied, the terminal device directly initiates handover access to the target cell without triggering the measurement reporting process.

The condition used in the conditional handover may be configured based on a Radio Resource Management (RRM) measurement event; the RRM measurement event may be an A3 event or an A5 event. Taking the A3 event as an example, it is determined whether the signal quality of the neighboring cell is higher than that of the serving cell; where the signal quality may be characterized by a value of Reference Signal Receiving Power (RSRP).

Figure 2A:
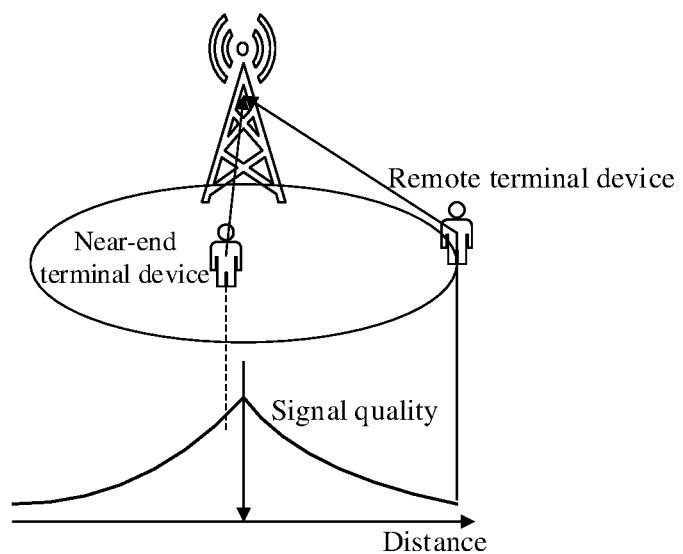
FIG. 2a is a schematic diagram of a relationship between a distance between a network device and a terminal device and a RSRP value in the terrestrial network according to the present application.
Figure 2B:
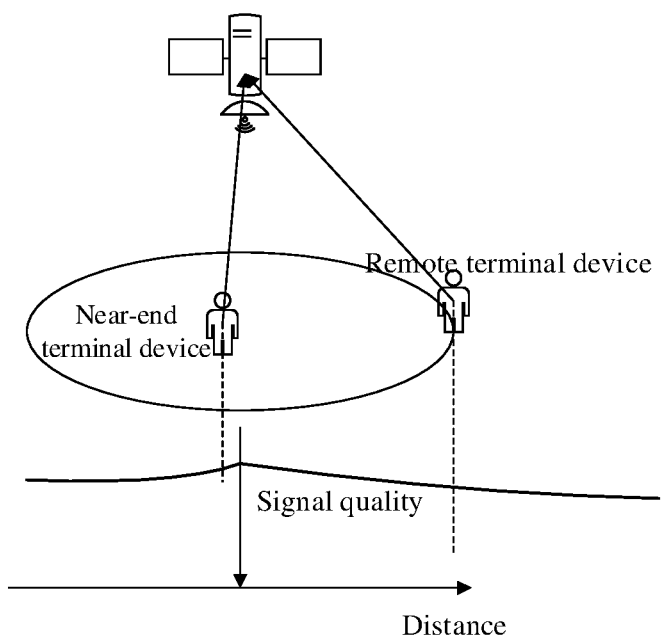
FIG. 2b is a schematic diagram of a relationship between a distance between a network device and a terminal device and a RSRP value in the NTN according to the present application.

As shown in FIG. 2a, in the terrestrial network, the transmission delay between the terminal device and the network device is small, and the value of RSRP can more accurately reflect the near-far effect. For example, the RSRP value of the terminal device that is closer to the network device is higher, and the RSRP value of the terminal device that is farther away from the network device is lower. As shown in FIG. 2b, due to the large propagation delay between the terminal device and the satellite in NTN, and most of them belong to line-of-sight transmission without scattering, the value of RSRP cannot accurately reflect the near-far effect due to its own measurement error; that is, a difference between the RSRP value of the terminal device that is closer to the network device in the NTN and the RSRP value of the terminal device that is farther away from the network device in the NTN is relatively small Therefore, in NTN, the timing of the conditional handover cannot be accurately determined according to the signal quality of the cell (e.g., RSRP), resulting in a low success rate of the conditional handover.

The technical solutions of the embodiments of the present application may be applied to various communication systems, for example: a global system of mobile communication (GSM), a code division multiple access (CDMA) system, a wideband code division multiple access (WCDMA) system, general packet radio service (GPRS), a long term evolution (LTE) system, an LTE frequency division duplex (FDD) system, an LTE Time division duplex (TDD) system, an advanced long term evolution (LTE-A) system, a new radio (NR) system, an evolution system for NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system or other communication systems, etc.

The system architecture and service scenarios described in the embodiments of the present application are for the purpose of illustrating the technical solutions of the embodiments of the present application more clearly, and do not constitute limitations on the technical solutions provided by the embodiments of the present application. It is known to those skilled in the art that with the evolution of the network architecture and the emergence of new service scenarios, the technical solutions provided in the embodiments of the present application are also applicable to similar technical problems.

The network device involved in the embodiments of the present application may be a common base station (such as a NodeB or eNB or gNB), a new radio controller (NR controller), a centralized unit, a new radio base station, a radio remote unit, a micro base station, a relay, a distributed unit, a transmission reception point (TRP), a transmission point (TP) or any other devices. The embodiments of the present application do not limit the specific technology and specific device form adopted by the network device. For the convenience of description, in all the embodiments of the present application, the above-mentioned apparatuses for providing a wireless communication function for the terminal device are collectively referred to as network devices.

In the embodiments of the present application, the terminal device may be any terminal, for example, the terminal device may be a user device of machine type communication. That is to say, the terminal device may also be referred to as user equipment (UE), a mobile station (MS), a mobile terminal, a terminal, etc., and the terminal device may communicate with one or more core networks via radio access network (RAN). For example, the terminal device may be a mobile phone (or "cellular" phone), a computer with a mobile terminal, etc. For example, the terminal device may also be a portable, pocket-sized, handheld, computer built-in or vehicle mounted mobile device that exchanges language and/or data with the radio access network. There is no specific limitation in the embodiments of the present application.

Optionally, the network device and the terminal device may be deployed on land, including indoor or outdoor, handheld or vehicle-mounted; they may also be deployed on water; they may also be deployed on aircraft, balloons and artificial satellites in the air. The embodiments of the present application do not limit the application scenarios of the network device and the terminal device.

Optionally, communication between the network device and the terminal device and communication between the terminal device and the terminal device may be performed through licensed spectrum, or through unlicensed spectrum, or may be performed through both licensed spectrum and unlicensed spectrum. The communication between the network device and the terminal device and the communication between the terminal device and the terminal device may be carried out through the spectrum below 7 gigahertz (GHz), or through the frequency spectrum above 7 GHz, or may be carried out by using the frequency spectrum below 7 GHz and the frequency spectrum above 7 GHz at the same time. The embodiments of the present application do not limit the spectrum resources used between the network device and the terminal device.

Generally speaking, traditional communication systems support a limited number of connections and the connections are easy to be implemented. However, with the development of communication technology, mobile communication systems will not only support traditional communication, but also support, for example, device to device (D2D) communication, machine to machine (M2M) communication, machine type communication (MTC), and vehicle to vehicle (V2V) communication, etc. The embodiments of the present application can also be applied to these communication systems.

Figure 3:
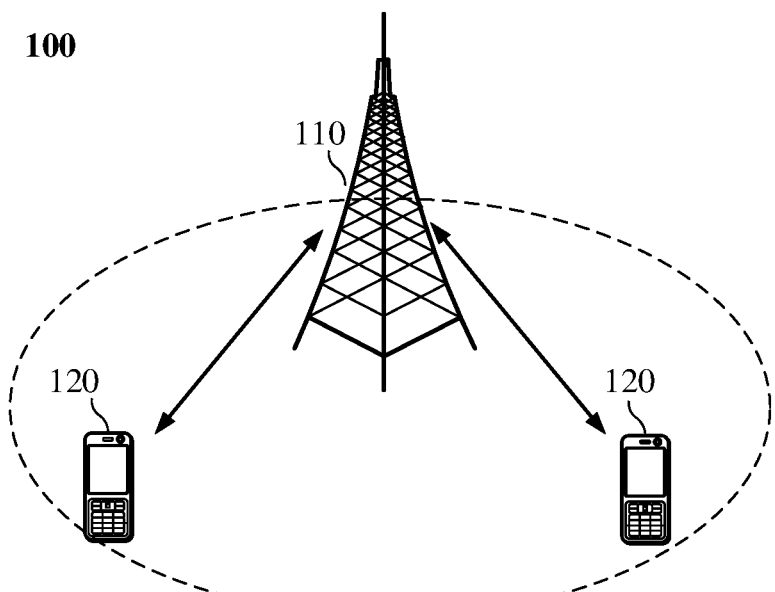
FIG. 3 is a schematic diagram of a composition structure of a communication system according to an embodiment of the present application.

Exemplarily, the communication system 100 applied in the embodiments of the present application is as shown in FIG. 3. The communication system 100 may include a network device 110, and the network device 110 may be a device that communicates with a terminal device 120 (or referred to as a communication terminal, a terminal). The network device 110 may provide communication coverage for a particular geographic area, and may communicate with terminal devices located within the coverage area. Optionally, the network device 110 may be a Base Transceiver Station (BTS) in a GSM system or a CDMA system, a base station (NodeB, NB) in a WCDMA system, or an Evolutional Node B (eNB or eNodeB) in an LTE system, or a wireless controller in a Cloud Radio Access Network (CRAN), or the network device may be a mobile switching center, a relay station, an access point, an on-board equipment, a wearable device, a hub, a switch, a bridge, a router, a network-side device in 5G networks, or a network device in the future evolved Public Land Mobile Network (PLMN), etc.

The communication system 100 also includes at least one terminal device 120 located within the coverage of the network device 110. As used herein, the term "terminal device" includes, but is not limited to, a device configured to connect via a wired circuit, for example, via a Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus of another terminal device that is configured to receive/send a communication signal; and/or an Internet of Things (IoT) device. The terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communication System (PCS) terminal capable of combining with a cellular wireless telephone and data processing, faxing, and data communication capabilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatus including a radio telephone transceiver. The terminal device may refer to an access terminal, a User Equipment (UE), a subscriber unit, a subscriber station, a mobile station, a mobile, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a 5G network, or a terminal device in a future evolved Public Land Mobile Network (PLMN), or the like.

Alternatively, terminal direct connection (Device to Device, D2D) communication may be performed between the terminal devices 120.

Alternatively, the 5G system or 5G network may be referred to as a New Radio (NR) system or an NR network.

FIG. 3 exemplarily shows one network device and two terminal devices. Optionally, the communication system 100 may include a plurality of network devices and the coverage of each network device may include other numbers of terminal devices, which is not limited by the embodiments of the present application.

Optionally, the communication system 100 may further include other network entities such as a network controller and a mobility management entity, which are not limited in the embodiments of the present application.

It should be understood that, in the embodiments of the present application, a device having a communication function in the network/system may be referred to as a communication device. Taking the communication system 100 shown in FIG. 3 as an example, the communication device may include a network device 110 and a terminal device 120 with a communication function, and the network device 110 and the terminal device 120 may be the specific devices described above, which will not be repeated here. The communication device may further include other devices in the communication system 100, such as other network entities such as a network controller and a mobility management entity, which are not limited in the embodiments of the present application.

Figure 4:
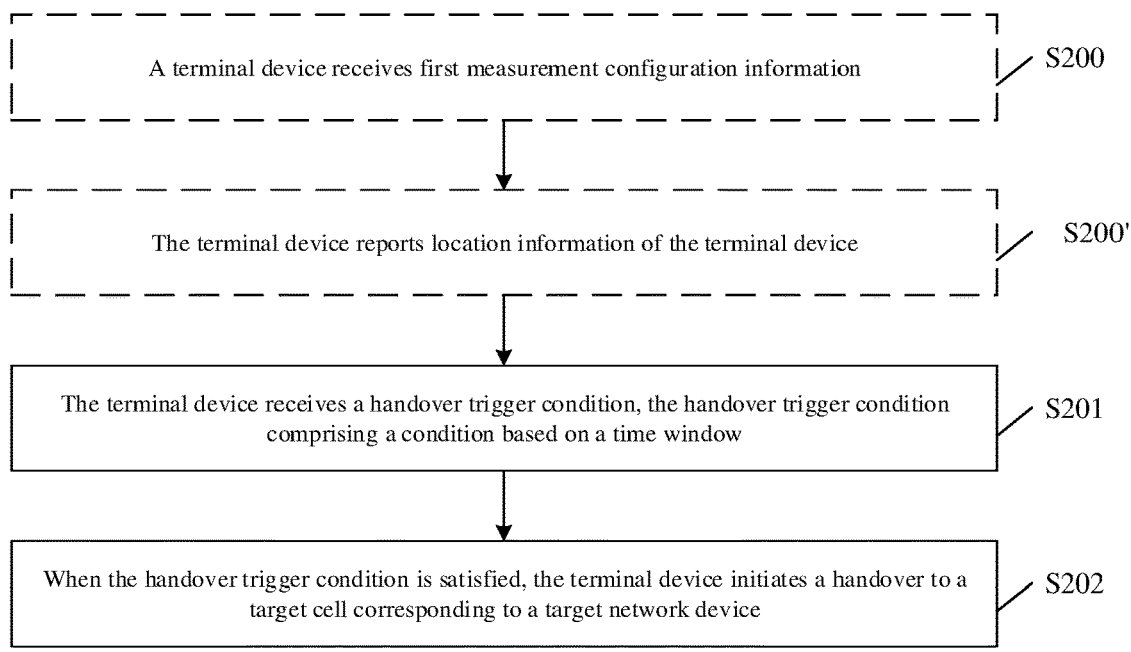
FIG. 4 is a schematic diagram of an optional processing flow of a cell handover method according to an embodiment of the present application.

As shown in FIG. 4, an optional processing flow of the cell handover method provided by the embodiment of the present application includes the following steps.

In step S201, the terminal device receives a handover trigger condition, where the handover trigger condition includes a condition based on a time window.

In some embodiments, the terminal device receives the handover trigger condition sent by a source network device. The handover trigger condition is used for the terminal device to perform conditional handover. For example, when the handover trigger condition is satisfied, the terminal device performs conditional handover.

In some embodiments, the handover trigger condition includes a condition based on a time window; for example, the conditional handover is performed within a specific time window; the time window is located between the earliest moment of the cell handover determined by a target network device and the latest moment of the cell handover determined by the source network device.

In some embodiments, the handover trigger condition may further include: a condition based on a measurement event; where the measurement event may be an A3 event or an A5 event.

In some embodiments, the cell handover method may further include the following steps.

In step S202, in the case that the handover trigger condition is satisfied, the terminal device initiates a handover to a target cell corresponding to the target network device.

In some embodiments, if the current moment is within the time window and the A3 or A5 measurement event satisfies the handover trigger condition, the terminal device initiates a handover to the target cell corresponding to the target network device.

In some embodiments, the cell handover method may further include the following step.

In step S200, the terminal device receives first measurement configuration information.

In some embodiments, the terminal device receives the first measurement configuration information sent by the source network device.

In some embodiments, the first measurement configuration information is used for instructing the terminal device to report location information of the terminal device.

In some embodiments, the first measurement configuration information may include: a configuration in which the terminal device independently reports the location information of the terminal device, that is, the location information of the terminal device is carried in independent information; or, the first measurement configuration information may include: a configuration in which reporting the location information of the terminal device is added in a measurement event configuration, that is, the location information of the terminal device is carried in the reporting information triggered by the measurement event; and the measurement event may be an A3 event or an A5 event.

In some embodiments, the cell handover method may further include the following step.

In step S200', the terminal device reports the location information of the terminal device.

In some embodiments, the terminal device reports the location information of the terminal device to the source network device.

In some embodiments, the terminal device may separately report the location information of the terminal device according to the first measurement configuration information, that is, the location information of the terminal device is carried in independent information.

In other embodiments, the terminal device may carry the location information of the terminal device in the reporting information triggered by the measurement event according to the first measurement configuration information; where the measurement event may be an A3 event or an A5 event.

Figure 5:
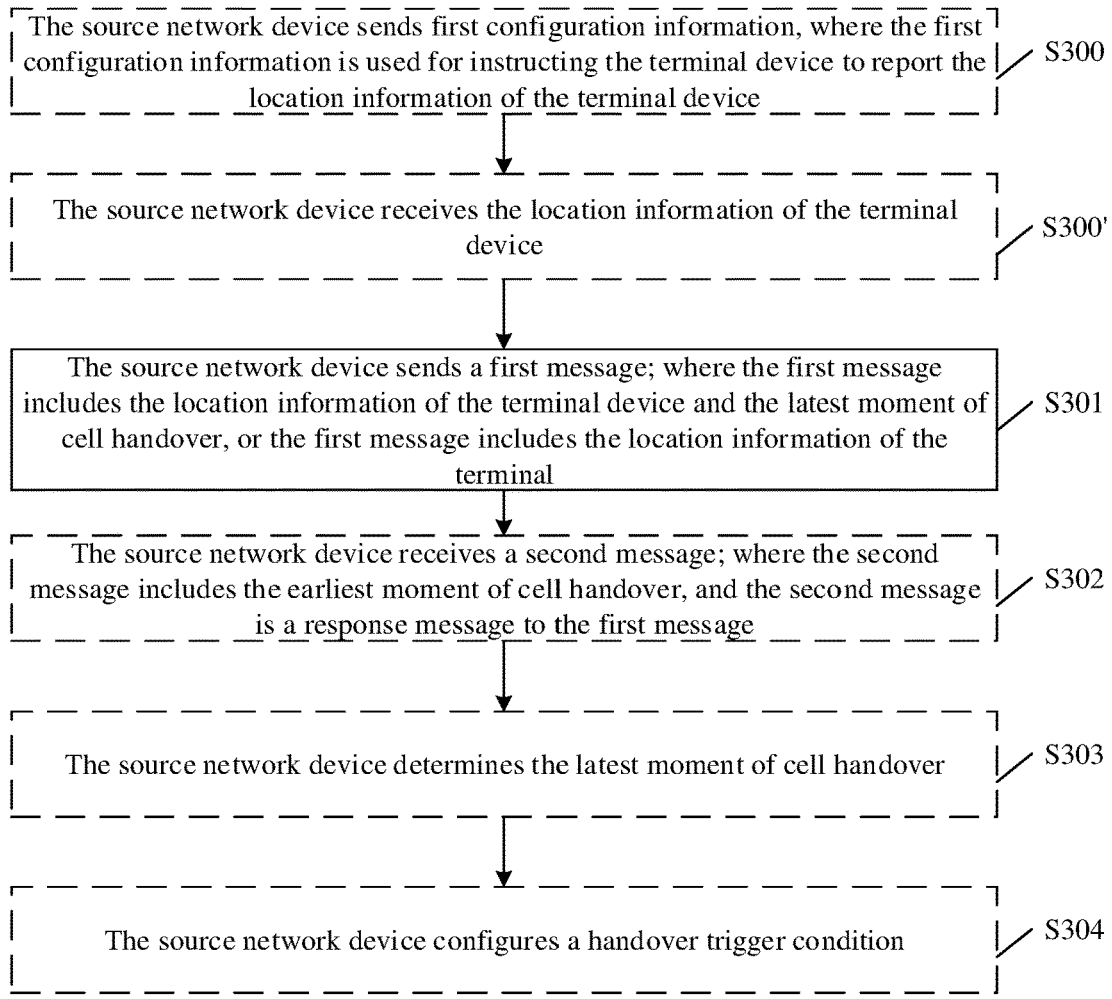
FIG. 5 is a schematic diagram of another optional processing flow of the cell handover method according to the embodiment of the present application.

As shown in FIG. 5, another optional processing flow of the cell handover method provided by the embodiment of the present application includes the following steps.

In step S301, the source network device sends a first message; where the first message includes location information of the terminal device and the latest moment of cell handover, or the first message includes the location information of the terminal device.

In some embodiments, the source network device sends the first message to the target network device. The first message may include the location information of the terminal device and the latest moment of cell handover; or, the first message may include the location information of the terminal device, but does not include the latest moment of cell handover.

In some embodiments, the first message carries a cell handover request message.

In some embodiments, the cell handover method may further include the following step.

In step S302, the source network device receives a second message; where the second message includes the earliest moment of cell handover, and the second message is a response message to the first message.

In some embodiments, the source network device receives the second message sent by the target network device; the earliest moment of the cell handover included in the second message is determined by the target network device according to the location information of the terminal device, a beam coverage angle of the target network device and ephemeris information of a satellite where the target network device is located.

In some embodiments, in the case that the first message includes the location information of the terminal device and the latest moment for cell handover, the source network device can configure a handover trigger condition after receiving the second message sent by the target network device.

In other embodiments, in the case that the first message includes the location information of the terminal device and does not include the latest moment of the cell handover, after the source network device receives the second message sent by the target network device, the cell handover method may also include the following step.

In step S303, the source network device determines the latest moment for cell handover.

In some embodiments, the source network device determines the latest moment for the cell handover according to the location information of the terminal device, a beam coverage angle of the source network device, and ephemeris information of a satellite where the source network device is located.

When the earliest moment of the cell handover is earlier than the latest moment of the cell handover, the method may further include the following step.

In step S304, the source network device configures a handover trigger condition.

In some embodiments, the handover trigger condition is a handover trigger condition for the target cell, and the handover trigger condition is used for the terminal device to perform conditional handover. For example, when the handover trigger condition is satisfied, the terminal device performs conditional handover.

In some embodiments, the handover trigger condition includes a condition based on a time window; for example, the conditional handover is performed within a specific time window; the time window is located between the earliest moment of the cell handover determined by the target network device and the latest moment of the cell handover determined by the source network device.

In some embodiments, the handover trigger condition may further include: a condition based on a measurement event; where the measurement event may be an A3 event or an A5 event.

In the case that the earliest moment of the cell handover is later than or equal to the latest moment of the cell handover, the source network device does not configure the conditional handover configuration for the target cell.

In some embodiments, the cell handover method may further include the following step.

In step S300, the source network device sends first configuration information, where the first configuration information is used for instructing the terminal device to report the location information of the terminal device.

In some embodiments, the source network device sends the first configuration information to the terminal device.

In some embodiments, the first measurement configuration information is used for instructing the terminal device to report the location information of the terminal device.

In some embodiments, the first measurement configuration information may include: a configuration in which the terminal device independently reports the location information of the terminal device, that is, the location information of the terminal device is carried in independent information; or, the first measurement configuration information may include: a configuration in which reporting the location information of the terminal device is added into a measurement event configuration, that is, the location information of the terminal device is carried in the reporting information triggered by the measurement event; where the measurement event may be an A3 event or an A5 event.

In some embodiments, the cell handover method may further include the following step.

In step S300', the source network device receives the location information of the terminal device.

In some embodiments, the source network device receives the location information of the terminal device reported by the terminal device.

In some embodiments, the terminal device may separately report the location information of the terminal device according to the first measurement configuration information, that is, the location information of the terminal device is carried in independent information.

In other embodiments, the terminal device may carry the location information of the terminal device in the reporting information triggered by the measurement event according to the first measurement configuration information; where the measurement event may be an A3 event or an A5 event.

Figure 6:
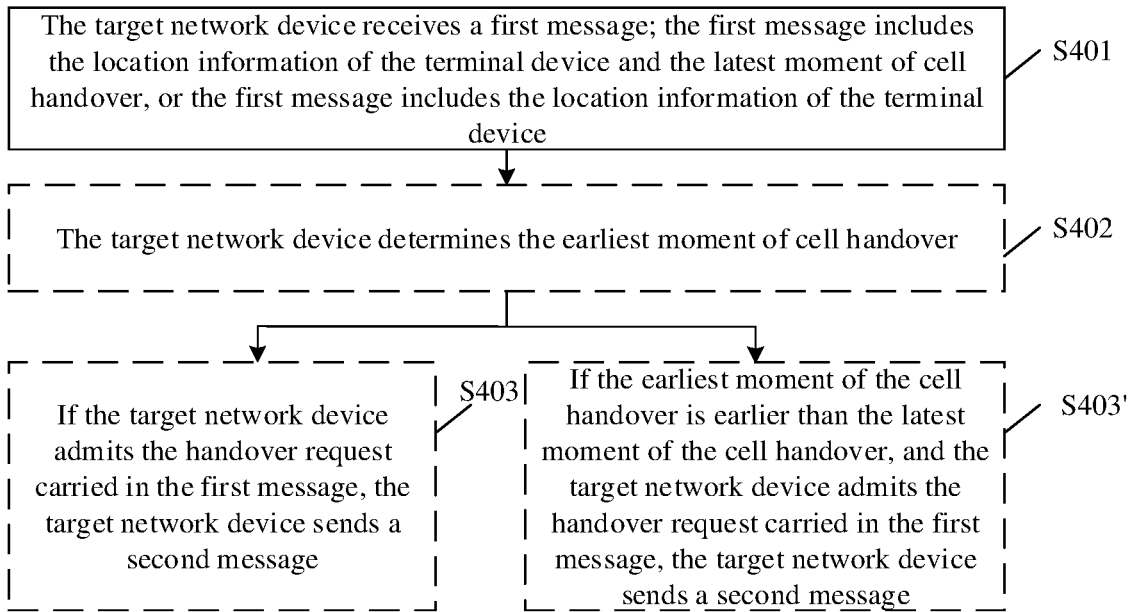
FIG. 6 is a schematic diagram of another optional processing flow of the cell handover method according to the embodiment of the present application.

As shown in FIG. 6, another optional processing flow of the cell handover method provided by the embodiment of the present application includes the following steps.

In step S401, the target network device receives a first message; the first message includes location information of the terminal device and the latest moment of cell handover, or the first message includes the location information of the terminal device.

In some embodiments, the first message carries a cell handover request message.

In some embodiments, the cell handover method may further include the following step.

In step S402, the target network device determines the earliest moment of cell handover.

In some embodiments, the target network device determines the earliest moment for cell handover according to the location information of the terminal device, a beam coverage angle of the target network device, and the ephemeris information of a satellite where the target network device is located.

In some embodiments, when the first message includes the location information of the terminal device and does not include the latest moment for cell handover, the cell handover method may further include the following step.

In step S403, if the target network device admits a handover request carried in the first message, the target network device sends a second message.

In some embodiments, the target network device performs an admission control after receiving the handover request sent by the source network device, and if the admission control is passed, the target network device sends the second message to the source network device.

The second message may include the earliest moment of cell handover, and the second message is a response message of the first message.

In other embodiments, when the first message includes the location information of the terminal device and the latest moment for cell handover, the cell handover method may further include the following step.

In step S403', if the earliest moment of the cell handover is earlier than the latest moment of the cell handover, and the target network device admits the handover request carried in the first message, the target network device sends a second message.

In some embodiments, the target network device determines whether the earliest moment of cell handover is earlier than the latest moment of cell handover, and if the earliest moment of cell handover is earlier than the latest moment of cell handover, the target network device performs admission control; if the admission control is passed, the target network device sends a second message to the source network device; the second message includes the earliest moment of the cell handover, and the second message is a response message to the first message.

If the admission control is not passed, or the earliest moment of cell handover is not earlier than the latest moment of cell handover, the target network device sends a handover reject message to the source network device.

Figure 7:
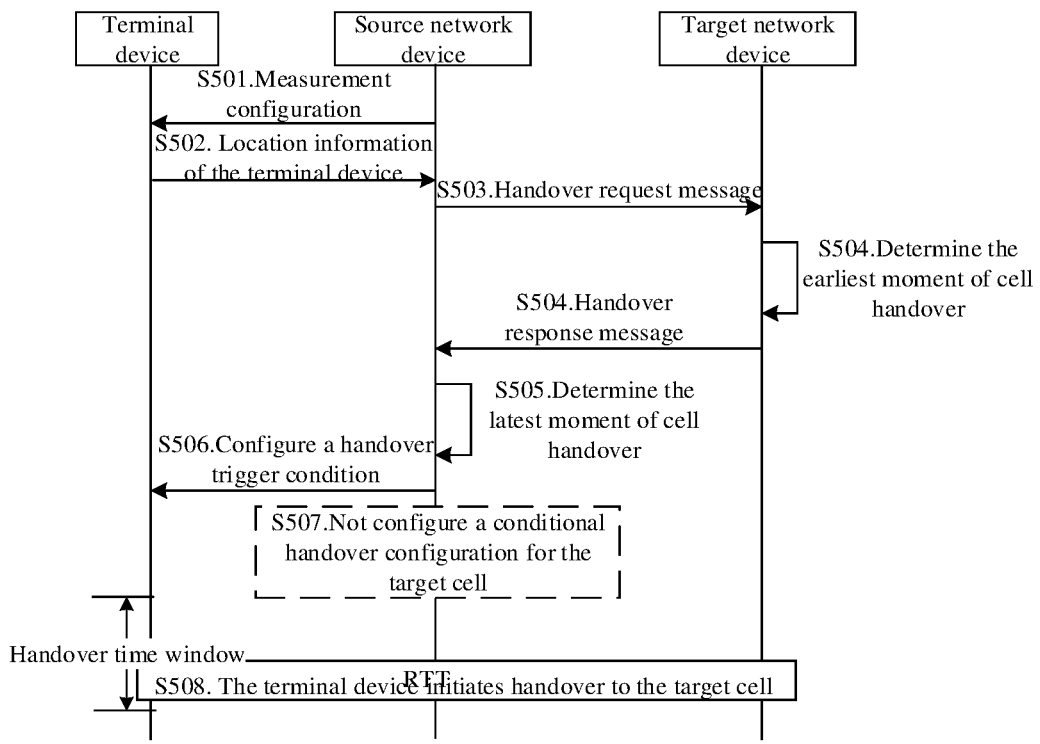
FIG. 7 is a schematic diagram of a detailed optional processing flow of a cell handover method according to an embodiment of the present application.

As shown in FIG. 7, a detailed optional processing flow of the cell handover method provided by the embodiment of the present application includes the following steps.

In step S501, the source network device sends a measurement configuration to the terminal device.

In some embodiments, the measurement configuration is used for requesting the terminal device to report location information of the terminal device.

In some embodiments, the measurement configuration may be: a separate measurement configuration for reporting location information, or a configuration for additionally reporting location information in a measurement event (e.g., A3 or A5 event) configuration.

In some embodiments, the measurement configuration includes a report request message for reporting the location information of the terminal device.

In step S502, the terminal device reports the location information of the terminal device to the source network device.

In a specific implementation, the terminal device may separately report the location information of the terminal device according to the measurement configuration sent by the source network device; or, the terminal device may carry the location information of the terminal device in the reporting information triggered by the measurement event according to the measurement configuration sent by the source network device.

In step S503, the source network device sends a handover request message to the target network device.

In some embodiments, the source network device decides to initiate a conditional handover and sends a handover request to the target network device.

In some embodiments, the request message includes the location information of the terminal device.

In step S504, the target network device determines the earliest moment of the cell handover, and responds with a handover response message.

In some embodiments, the target network device performs admission control after receiving the handover request message. If the admission control is passed, the target network device determines the earliest moment of cell handover according to the location information of the terminal device, the beam coverage angle of the target network device and the ephemeris information of the satellite where the target network device is located, and replies with the handover response message; where the handover response message may also include a handover command.

In other embodiments, the target network device performs admission control after receiving the handover request message. If admission control is not passed, the target network device replies with a handover reject message.

In step S505, the source network device determines the latest moment for cell handover.

In some embodiments, after receiving the handover response message sent by the target network device, the source network device may determine the latest moment of cell handover according to the location information of the terminal device, the beam coverage angle of the source network device, and the ephemeris information of the satellite where the source network device is located.

In step S506, if the earliest moment of cell handover determined by the target network device is earlier than the latest moment of cell handover determined by the source network device, the source network device configures a handover trigger condition.

In some embodiments, when configuring the handover trigger condition, the source network device configures a condition based on a time window and/or a condition based on a measurement event; where the condition based on a measurement event may be an A3 event or A5 event-based condition.

In some embodiments, the terminal device may initiate a conditional handover within the time window; the time window is between the earliest moment of cell handover determined by the target network device and the latest moment of handover determined by the source network device.

In step S507, if the earliest moment of the cell handover is not earlier than the latest moment of the cell handover, the source network device does not configure the conditional handover configuration for the target cell.

In step S508, the terminal device initiates handover to the target cell.

In some embodiments, the terminal device evaluates the handover condition after receiving the conditional handover configuration; the terminal device initiates a handover to the target cell when the following conditions are met: the A3/A5 event satisfies the triggering condition (if the A3/A5 event is configured); and the current moment is within the time window.

After the terminal device is successfully handed over to the target cell, the terminal device leaves the source cell corresponding to the source network device and establishes an RRC connection with the target network device.

Figure 8:
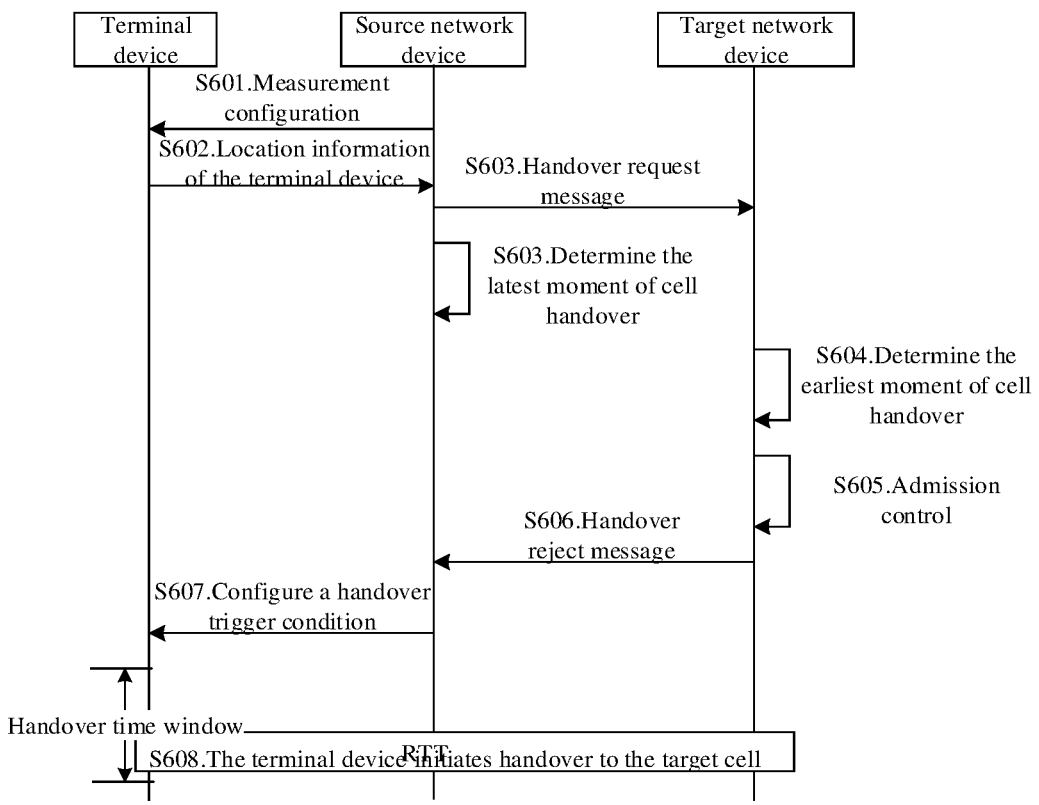
FIG. 8 is a schematic diagram of another detailed optional processing flow of the cell handover method according to the embodiment of the present application.

As shown in FIG. 8, another detailed optional processing flow of the cell handover method provided by the embodiments of the present application includes the following steps.

In step S601, the source network device sends a measurement configuration to the terminal device.

In some embodiments, the measurement configuration is used for requesting the terminal device to report location information of the terminal device.

In some embodiments, the measurement configuration may be: a separate measurement configuration for reporting location information, or a configuration for additionally reporting location information in a measurement event (e.g., A3 or A5 event) configuration.

In step S602, the terminal device reports the location information of the terminal device to the source network device.

In a specific implementation, the terminal device may separately report the location information of the terminal device according to the measurement configuration sent by the source network device; or, the terminal device may carry the location information of the terminal device in the reporting information triggered by the measurement event according to the measurement configuration sent by the source network device.

In step S603, the source network device sends a handover request message to the target network device.

In some embodiments, the source network device decides to initiate a conditional handover and sends a handover request to the target network device.

In some embodiments, the request message includes the location information of the terminal device and the latest moment of cell handover.

In some embodiments, the latest moment of cell handover is determined by the source network device according to the location information of the terminal device, the beam coverage angle of the source network device and the ephemeris information of the satellite where the source network device is located.

In step S604, the target network device determines the earliest moment of cell handover.

In some embodiments, after the target network device receives the handover request message, the target network device determines the earliest moment for cell handover according to the location information of the terminal device, the beam coverage angle of the target network device, and the ephemeris information of the satellite where the target network device is located.

In step S605, if the earliest moment of the cell handover is earlier than the latest moment of the cell handover, the target network device performs admission control.

In some embodiments, the target network device replies with a handover response message if admission control is passed.

In other embodiments, the target network device replies with a handover reject message if admission control is not passed.

In other embodiments, the target network device performs admission control after receiving the handover request message. If admission control is not passed, the target network device replies with a handover reject message.

In step S606, if the earliest moment of the cell handover is not earlier than the latest moment of the cell handover, the target network device replies with the handover reject message.

In step S607, the source network device configures a handover trigger condition.

In some embodiments, when configuring the handover trigger condition, the source network device configures a condition based on a time window and/or a condition based on a measurement event; where the condition based on a measurement event may be a condition based on A3 event or A5 event.

In some embodiments, the terminal device may initiate a conditional handover within the time window; the time window is between the earliest moment of cell handover determined by the target network device and the latest moment of handover determined by the source network device.

In step S608, the terminal device initiates a handover to the target cell.

In some embodiments, the terminal device evaluates the handover condition after receiving the conditional handover configuration; the terminal device initiates a handover to the target cell when the following conditions are met: the A3/A5 event satisfies the triggering condition (if the A3/A5 event is configured); and the current moment is within the time window.

After the terminal device is successfully handed over to the target cell, the terminal device leaves the source cell corresponding to the source network device and establishes an RRC connection with the target network device.

It should be noted that, in the above embodiments of the present application, the earliest moment of cell handover may also be referred to as the earliest handover time; the latest moment of cell handover may also be referred to as the latest handover time.

In the above embodiments of the present application, the terminal device receives the handover trigger condition sent by the source network device; the handover trigger condition includes a condition based on a time window, and the time window is located between the earliest moment of cell handover determined by the target network device and the latest moment of cell handover determined by the source network cell. In this way, the terminal device can determine whether to initiate a conditional handover according to the time window in the handover trigger condition, that is, the terminal device can determine whether to initiate a conditional handover according to the earliest moment of the cell handover determined by the target network device and the latest moment of the cell handover determined by the source network device. During conditional handover, it is avoided to use the channel quality that is insensitive to a distance between the terminal device and the network device as the handover condition, so as to improve the success rate of conditional handover in NTN.

It should be understood that, in various embodiments of the present application, the size of the sequence numbers of the above-mentioned processes does not mean the sequence of execution, and the execution sequence of each process should be determined by its functions and internal logic, and should not constitute any limitation on the implementation process of the embodiments of the present application.

Figure 9:
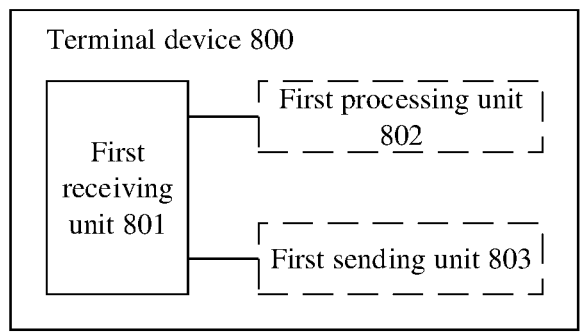
FIG. 9 is a schematic structural diagram of an optional composition of a terminal device according to an embodiment of the present application.

To implement the above cell handover method, an embodiment of the present application provides a terminal device. As shown in FIG. 9, an optional structural schematic diagram of the terminal device 800 includes:

a first receiving unit 801, configured to receive a handover trigger condition; where the handover trigger condition includes a condition based on a time window, and the time window is used for representing a handover time at which the terminal device initiates the conditional handover.

In some embodiments, the time window is located between the earliest moment of cell handover determined by the target network device and the latest moment of cell handover determined by the source network device.

In some embodiments, the handover trigger condition further includes a condition based on a measurement event.

In some embodiments, the terminal device 800 further includes:

a first processing unit 802, configured to initiate a handover to a target cell corresponding to the target network device when the handover trigger condition is satisfied.

In some embodiments, the first receiving unit 801 is further configured to receive first measurement configuration information, where the first measurement configuration information is used for instructing the terminal device to report the location information of the terminal device.

In some embodiments, the terminal device 800 further includes: a first sending unit 803 configured to report the location information of the terminal device.

In some embodiments, the location information of the terminal device is carried in independent information, or the location information of the terminal device is carried in the reporting information triggered by the measurement event.

Figure 10:
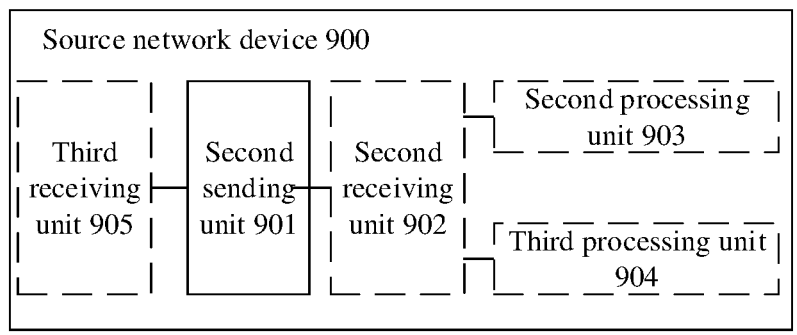
FIG. 10 is a schematic diagram of an optional composition structure of a source network device according to an embodiment of the present application.

In order to implement the above cell handover method, an embodiment of the present application provides a source network device, and as shown in FIG. 10, an optional structural schematic diagram of the source network device 900 includes:

a second sending unit 901, configured to send a first message; where the first message includes location information of the terminal device and the latest moment of cell handover, or the first message includes the location information of the terminal device.

In some embodiments, the source network device 900 further includes:

a second receiving unit 902, configured to receive a second message; where the second message includes the earliest moment of cell handover, and the second message is a response message to the first message.

In some embodiments, the earliest moment of the cell handover is determined by the target network device according to the location information of the terminal device, the beam coverage angle of the target network device, and the ephemeris information of the satellite where the target network device is located.

In some embodiments, the source network device 900 further includes:

a second processing unit 903, configured to, when the first message includes the location information of the terminal device, determine the latest moment for cell handover after the source network device receives the second message.

In some embodiments, the latest moment of the cell handover is determined by the source network device according to the location information of the terminal device, the beam coverage angle of the source network device, and the ephemeris information of the satellite where the source network device is located.

In some embodiments, the source network device 900 further includes:
a third processing unit 904, configured to configure a handover trigger condition when the earliest moment of the cell handover is earlier than the latest moment of the cell handover.

In some embodiments, the handover trigger condition includes a condition based on a time window, and the time window is used for representing a handover time at which the terminal device initiates the conditional handover.

In some embodiments, the time window is located between the earliest moment of cell handover determined by the target network device and the latest moment of cell handover determined by the source network device.

In some embodiments, the handover trigger condition further includes a condition based on a measurement event.

In some embodiments, the second sending unit 901 is further configured to send first configuration information, where the first configuration information is used for instructing the terminal device to report the location information of the terminal device.

In some embodiments, the source network device 900 further includes:
a third receiving unit 905, configured to receive the location information of the terminal device.

In some embodiments, the location information of the terminal device is carried in independent information, or the location information of the terminal device is carried in the reporting information triggered by the measurement event.

Figure 11:
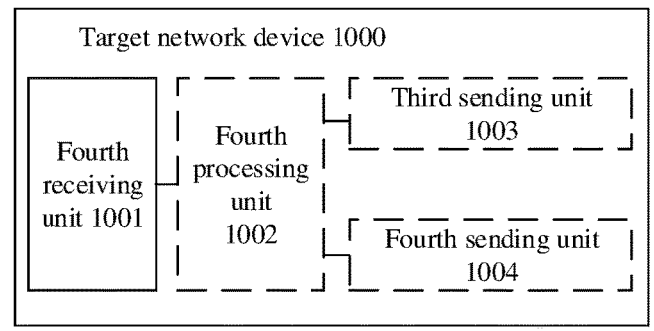
FIG. 11 is a schematic diagram of an optional composition structure of a target network device according to an embodiment of the present application.

In order to implement the above cell handover method, an embodiment of the present application provides a target network device, and as shown in FIG. 11, an optional structural schematic diagram of the target network device 1000 includes:
a fourth receiving unit 1001, configured to receive a first message;
where the first message includes location information of the terminal device and the latest moment of cell handover, or the first message includes the location information of the terminal device.

In some embodiments, the target network device 1000 further includes: a fourth processing unit 1002, configured to determine the earliest moment of cell handover.

In some embodiments, the earliest moment of the cell handover is determined by the target network device according to the location information of the terminal device, the beam coverage angle of the target network device, and the ephemeris information of the satellite where the target network device is located.

In some embodiments, the target network device 1000 further includes: a third sending unit 1003 configured to, in the case that the first message includes the location information of the terminal device, if the target network device admits the handover request carried in the first message, send a second message; where the second message includes the earliest moment of cell handover, and the second message is a response message to the first message.

In some embodiments, the target network device 1000 further includes:
a fourth sending unit 1004, configured to, in a case that the first message includes the location information of the terminal device and the latest moment of the cell handover, if the earliest moment of the cell handover is earlier than the latest moment of the cell handover, and the target network device admits the handover request carried in the first message, send a second message; where the second message includes the earliest moment of the cell handover, and the second message is a response message to the first message.

An embodiment of the present application further provides a terminal device, including a processor and a memory for storing a computer program that can be run on the processor, where the processor is configured to, when running the computer program, execute the above steps of the cell handover method performed by the terminal device.

An embodiment of the present application further provides a source network device, including a processor and a memory for storing a computer program that can be run on the processor, where the processor is configured to, when running the computer program, execute the above steps of the cell handover method performed by the source network device.

An embodiment of the present application further provides a target network device, including a processor and a memory for storing a computer program that can be run on the processor, where the processor is configured to, when running the computer program, execute the above steps of the cell handover method performed by the target network device.

An embodiment of the present application further provides a chip, including: a processor, configured to call and run a computer program from a memory, so that a device on which the chip is installed executes the cell handover method performed by the terminal device.

An embodiment of the present application further provides a chip, including: a processor, configured to call and run a computer program from a memory, so that a device on which the chip is installed executes the cell handover method performed by the source network device.

An embodiment of the present application further provides a chip, including: a processor configured to call and run a computer program from a memory, so that a device installed with the chip executes the cell handover method performed by the target network device.

An embodiment of the present application further provides a storage medium storing an executable program, and when the executable program is executed by a processor, the above-mentioned cell handover method performed by the terminal device is implemented.

An embodiment of the present application further provides a storage medium storing an executable program, and when the executable program is executed by a processor, the above-mentioned cell handover method performed by the source network device is implemented.

An embodiment of the present application further provides a storage medium storing an executable program, and when the executable program is executed by a processor, the above-mentioned cell handover method performed by the target network device is implemented.

An embodiment of the present application further provides a computer program product, including computer program instructions, the computer program instructions enable a computer to execute the cell handover method performed by the terminal device.

An embodiment of the present application further provides a computer program product, including computer program instructions, the computer program instructions enable a computer to execute the cell handover method performed by the source network device.

An embodiments of the present application further provides a computer program product, including computer program instructions, the computer program instructions enable a computer to execute the cell handover method performed by the target network device.

An embodiment of the present application further provides a computer program, the computer program enables a computer to execute the above cell handover method performed by the terminal device.

An embodiment of the present application further provides a computer program, the computer program enables a computer to execute the above cell handover method performed by the source network device.

An embodiment of the present application further provides a computer program, the computer program enables a computer to execute the above cell handover method performed by the target network device.

Figure 12:
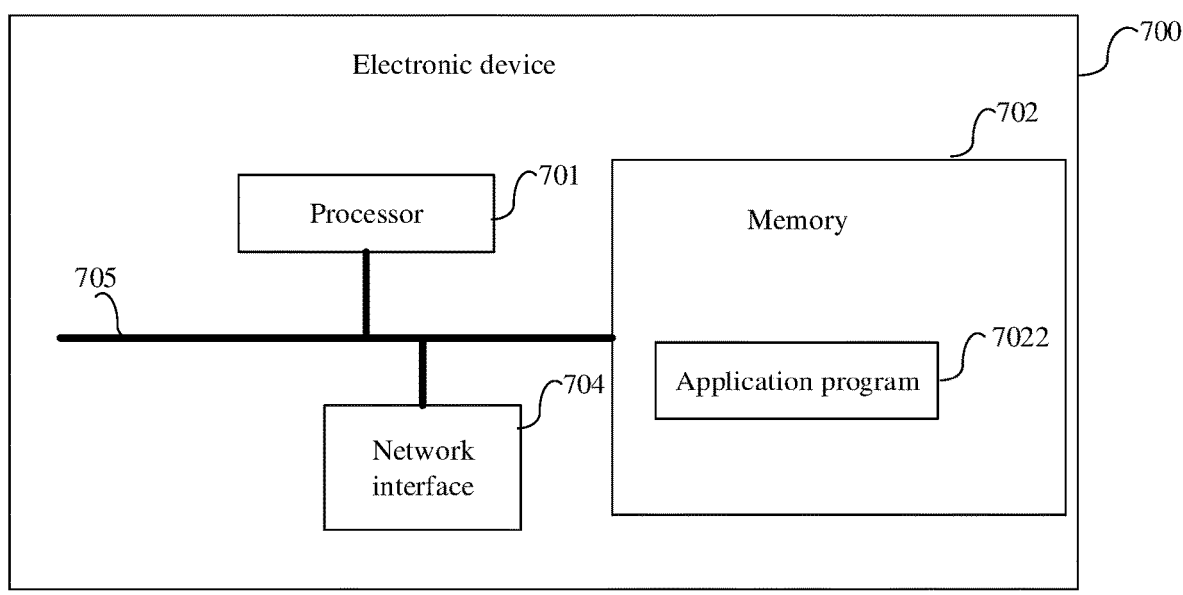
FIG. 12 is a schematic structural diagram of a hardware composition of an electronic device according to an embodiment of the present application.

FIG. 12 is a schematic diagram of a hardware composition of an electronic device (terminal device, source network device, or target network device) according to an embodiment of the present application. The electronic device 700 includes: at least one processor 701, a memory 702 and at least one network interface 704. The various components in the electronic device 700 are coupled together by a bus system 705. It can be understood that the bus system 705 is used to implement the connection communication between these components. In addition to a data bus, the bus system 705 also includes a power bus, a control bus and a status signal bus. However, for the sake of clarity, the various buses are labeled as bus system 705 in FIG. 12.

It will be appreciated that the memory 702 may be a volatile memory or a non-volatile memory, and may include both the volatile memory and the non-volatile memory. Among them, the non-volatile memory may be an ROM, a Programmable Read-Only Memory (PROM), an Erasable Programmable Read-Only Memory (EPROM), an Electrically Erasable Programmable Read-Only Memory (EE-PROM), a ferromagnetic random access memory (FRAM), a Flash Memory, a magnetic surface memory, an optical disc, or a Compact Disc Read-Only Memory (CD-ROM); the magnetic surface memory may be a disk memory or a tape memory. The volatile memory may be a Random Access Memory (RAM), which is used as an external cache. By way of example and not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiments of the present application is intended to include, but not limited to, these and any other suitable types of memory.

The memory 702 in the embodiments of the present application is used to store various types of data to support the operation of the electronic device 700. Examples of such data include: any computer program used to operate on the electronic device 700, such as an application program 7022. The program for implementing the method of the embodiments of the present application may be included in the application program 7022.

The methods disclosed in the above embodiments of the present application may be applied to the processor 701 or implemented by the processor 701. The processor 701 may be an integrated circuit chip with signal processing capability. In the implementation process, each step of the above-mentioned method may be completed by an integrated logic circuit of hardware or an instruction in the form of software in the processor 701. The above-mentioned processor 701 may be a general-purpose processor, a Digital Signal Processor (DSP), or other programmable logic devices, discrete gates or transistor logic devices, discrete hardware components, and the like. The processor 701 may implement or execute the methods, steps, and logical block diagrams disclosed in the embodiments of the present application. The general-purpose processor may be a microprocessor or any conventional processor or the like. The steps of the method disclosed in the embodiments of the present application can be directly embodied as being executed by a hardware decoding processor, or executed by a combination of hardware and software modules in the decoding processor. The software module may be located in a storage medium, and the storage medium is located in the memory 702, and the processor 701 reads information in the memory 702, and completes the steps of the foregoing method in combination with its hardware.

In an exemplary embodiment, the electronic device 700 may be implemented by one or more Application Specific Integrated Circuit (ASIC), DSP, Programmable Logic Device (PLD), Complex Programmable Logic Device (CPLD), FPGA, general-purpose processor, controller, MCU, MPU, or other electronic component to perform the aforementioned method.

The present application is described with reference to flowcharts and/or block diagrams of methods, devices (systems), and computer program products according to the embodiments of the present application. It will be understood that each flow and/or block in the flowcharts and/or block diagrams, and combinations of flows and/or blocks in the flowcharts and/or block diagrams, can be implemented by computer program instructions. These computer program instructions may be provided to the processor of a general-purpose computer, special purpose computer, embedded processor or other programmable data processing device to produce a machine such that the instructions executed by the processor of the computer or other programmable data processing device produce means for implementing the functions specified in one or more flows of the flowcharts and/or one or more blocks of the block diagrams.

These computer program instructions may also be stored in a computer-readable memory capable of directing a computer or other programmable data processing device to function in a particular manner, such that the instructions stored in the computer-readable memory result in an article of manufacture comprising an instruction apparatus, and the instruction apparatus implements the functions specified in one or more flows of the flowcharts and/or one or more blocks of the block diagrams.

These computer program instructions may also be loaded on a computer or other programmable data processing device to cause a series of operational steps to be performed on the computer or other programmable device to produce a computer-implemented process, such that the instructions provide steps for implementing the functions specified in one or more flows of the flowcharts and/or one or more blocks of the block diagrams.

It should be understood that the terms "system" and "network" in the present application are often used interchangeably herein. The term "and/or" in the present application is only an association relationship to describe associated objects, which means that there may be three kinds of relationships, for example, A and/or B may mean the following three cases: A exists alone, A and B exist at the same time, and B exists alone. In addition, the character "/" in the present application generally indicates that the related objects have an "or" relationship.

The above descriptions are only preferred embodiments of the present application, and are not intended to limit the protection scope of the present application. Any modifications, equivalent replacements and improvements made within the spirit and principles of the present application shall be included in the within the protection scope of the present application.

What is claimed is:

1. A cell handover method, the method comprising:
receiving, by a terminal device, a handover trigger condition;
wherein the handover trigger condition comprises a condition based on a time window, and the time window is used for representing a handover time during which the terminal device initiates a conditional handover,
wherein the method further comprises:
receiving, by the terminal device, first measurement configuration information, wherein the first measurement configuration information is used for instructing the terminal device to report location information of the terminal device, and the location information is used to determine the time window,
wherein the time window is located between an earliest moment of cell handover determined by a target network device and a latest moment of cell handover determined by a source network device,
wherein the earliest moment of the cell handover is determined by the target network device according to the location information of the terminal device, a beam coverage angle of the target network device, and ephemeris information of a satellite where the target network device is located, and the latest moment of the cell handover is determined by the source network device according to the location information of the terminal device, a beam coverage angle of the source network device, and ephemeris information of a satellite where the source network device is located.

2. The method according to claim 1, wherein the handover trigger condition further comprises:
a condition based on a measurement event.

3. The method according to claim 1, wherein the method further comprises:
in a case that the handover trigger condition is satisfied, initiating, by the terminal device, a handover to a target cell corresponding to a target network device.

4. The method according to claim 1, wherein the method further comprises:
reporting, by the terminal device, the location information of the terminal device.

5. A cell handover method, the method comprising:
sending, by a source network device, a handover trigger condition;
wherein the handover trigger condition comprises a condition based on a time window, and the time window is used for representing a handover time during which a terminal device initiates a conditional handover,
wherein the method further comprises:
sending, by the source network device, first measurement configuration information, wherein the first measurement configuration information is used for instructing a terminal device to report location information of the terminal device, and the location information is used to determine the time window,
wherein the time window is located between an earliest moment of cell handover determined by a target network device and a latest moment of cell handover determined by the source network device,
wherein the earliest moment of the cell handover is determined by the target network device according to the location information of the terminal device, a beam coverage angle of the target network device, and ephemeris information of a satellite where the target network device is located, and the latest moment of the cell handover is determined by the source network device according to the location information of the terminal device, a beam coverage angle of the source network device, and ephemeris information of a satellite where the source network device is located.

6. The method according to claim 5, wherein the handover trigger condition further comprises:
a condition based on a measurement event.

7. The method according to claim 5, wherein the method further comprises:
receiving, by the source network device, the location information of the terminal device.

8. The method according to claim 5, wherein in a case that the handover trigger condition is satisfied, initiating, by a terminal device, a handover to a target cell corresponding to a target network device.

9. A terminal device, the terminal device comprising:
a processor and a memory for storing a computer program executable on the processor, wherein, the processor is configured to, when running the computer program, execute:
receiving a handover trigger condition;
wherein the handover trigger condition comprises a condition based on a time window, and the time window is used for representing a handover time during which the terminal device initiates a conditional handover,
wherein the processor is further configured to receive first measurement configuration information, wherein the first measurement configuration information is used for instructing the terminal device to report location information of the terminal device, and the location information is used to determine the time window,
wherein the time window is located between an earliest moment of cell handover determined by a target network device and a latest moment of cell handover determined by a source network device,
wherein the earliest moment of the cell handover is determined by the target network device according to the location information of the terminal device, a beam coverage angle of the target network device, and ephemeris information of a satellite where the target network device is located, and the latest moment of the cell handover is determined by the source network device according to the location information of the terminal device, a beam coverage angle of the source network device, and ephemeris information of a satellite where the source network device is located.

10. The terminal device according to claim 9, wherein the handover trigger condition further comprises:
a condition based on a measurement event.

11. The terminal device according to claim 9, wherein the processor is further configured to:
in a case that the handover trigger condition is satisfied, initiate a handover to a target cell corresponding to a target network device.

12. The terminal device according to claim 9, wherein the processor is further configured to:
report the location information of the terminal device.

13. A source network device, the source network device comprising:
a processor and a memory for storing a computer program executable on the processor, wherein, the processor is configured to, when running the computer program, execute:
sending a handover trigger condition;
wherein the handover trigger condition comprises a condition based on a time window, and the time window is used for representing a handover time during which a terminal device initiates a conditional handover,
wherein the processor is further configured to send first measurement configuration information, wherein the first measurement configuration information is used for instructing a terminal device to report location information of the terminal device, and the location information is used to determine the time window,
wherein the time window is located between an earliest moment of cell handover determined by a target network device and a latest moment of cell handover determined by the source network device,
wherein the earliest moment of the cell handover is determined by the target network device according to the location information of the terminal device, a beam coverage angle of the target network device, and ephemeris information of a satellite where the target network device is located, and the latest moment of the cell handover is determined by the source network device according to the location information of the terminal device, a beam coverage angle of the source network device, and ephemeris information of a satellite where the source network device is located.

14. The source network device according to claim 13, wherein the handover trigger condition further comprises:
a condition based on a measurement event.

15. The source network device according to claim 13, wherein the processor is further configured to:
receive the location information of the terminal device.

16. The source network device according to claim 13, wherein in a case that the handover trigger condition is satisfied, a handover is initiated by the terminal device to a target cell corresponding to the target network device.

* * * * *